United States Patent
Takekuma et al.

(10) Patent No.: US 7,679,673 B2
(45) Date of Patent: Mar. 16, 2010

(54) SOCKET

(75) Inventors: Akira Takekuma, Tokyo (JP);
Yoshifumi Yamaoka, Kanagawa (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1321 days.

(21) Appl. No.: 11/144,863

(22) Filed: Jun. 3, 2005

(65) Prior Publication Data

US 2005/0275748 A1    Dec. 15, 2005

(30) Foreign Application Priority Data

Jun. 14, 2004    (JP) .............................. 2004-174944

(51) Int. Cl.
*H04N 5/225*    (2006.01)
(52) U.S. Cl. ..................................... 348/375
(58) Field of Classification Search ......... 348/373–376; 250/208.1
See application file for complete search history.

(56) References Cited

U.S. PATENT DOCUMENTS

| 6,435,882 B1 | 8/2002 | Pitou | 439/70 |
| 6,730,019 B2 * | 5/2004 | Irion | 600/178 |
| 7,330,216 B2 * | 2/2008 | Purdy et al. | 348/375 |
| 7,500,614 B2 * | 3/2009 | Barber et al. | 235/462.43 |
| 2001/0007739 A1 * | 7/2001 | Eibofner et al. | 433/29 |
| 2004/0150744 A1 | 8/2004 | Koyanagi | 348/371 |
| 2006/0109422 A1 * | 5/2006 | Clark et al. | 351/205 |

FOREIGN PATENT DOCUMENTS

| JP | 61-096635 | 5/1986 |
| JP | 2003-258307 | 9/2003 |
| JP | 2003-319405 | 11/2003 |
| JP | 2004-079974 | 3/2004 |

* cited by examiner

*Primary Examiner*—Sinh Tran
*Assistant Examiner*—Dillon Durnford-Geszvain

(57) ABSTRACT

A socket in which a light-emitting diode can be attached and detached as needed close to the structure for holding a camera module. Socket comprises a spring contact part for contacting the leads or electrodes of the light-emitting diode, and an anchor for anchoring such that the direction of a dome section has a predetermined relationship with the camera module.

7 Claims, 5 Drawing Sheets

(a)

(b)

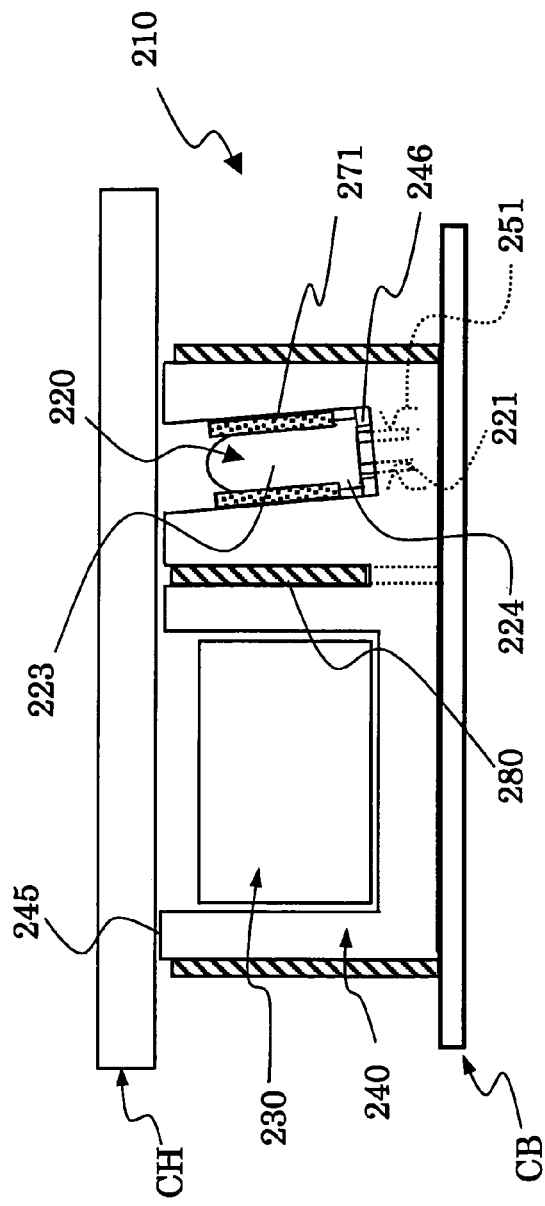
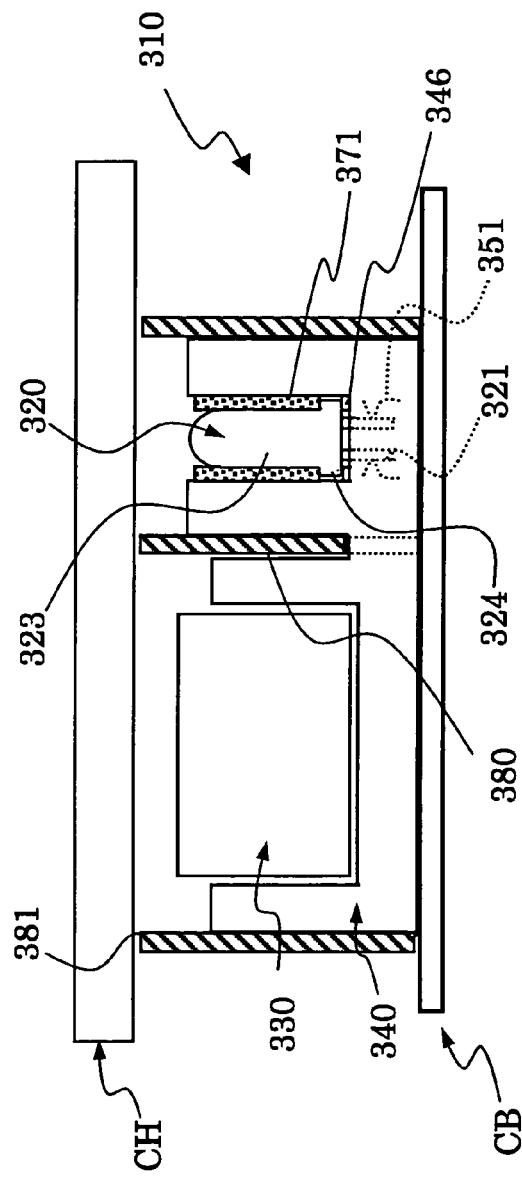
Fig.4
Fig.5

SOCKET

FIELD OF THE INVENTION

The present invention pertains to a method for loading a light-emitting diode, and is used together with a camera module in portable telephones and similar equipment.

DISCUSSION OF THE BACKGROUND ART

There are portable telephones and similar equipment being marketed wherein a camera module with an autofocus function is housed in the portable terminal, but the use of auxiliary light for autofocusing such as is used by digital cameras is also being considered for these telephones.

Camera units that use the auxiliary light employed in digital cameras are cited, for instance, in JP (Kokai) 2003-114, 369 and JP (Kokai) 2003-319,405. The general structure of the camera unit is shown in the latter reference. The unit comprises a camera module and a light-emitting diode as the auxiliary light source; the diode is disposed facing in the same direction as and in juxtaposition with the camera module.

A light-emitting diode used as an auxiliary light source is an optical design with a relatively high directivity in order to improve projection intensity during autofocusing. An example of a typical light-emitting diode is shown in JP (Kokai) 2003-258,307. The light-emitting diode comprises a pedestal on top of which there is a resin dome section with a predetermined optical design such that a relatively narrow angle of emission is realized, and electrodes for electrical connection extending to the sides of the pedestal.

On the other hand, flexible circuit boards are often used for electrical wiring on the inside of the portable terminal of ordinary portable telephones and similar equipment, and surface-mounted components having a variety of functions are mounted and connected on this flexible circuit board. Consequently, surface mounting on a flexible circuit board is considered for camera modules and light-emitting diodes as well.

Camera modules cannot be subjected to the reflow soldering process and the provision of a socket has been suggested for a conventional connection to a flexible circuit board by a separate process. When a socket is used for a camera module, only the socket is preconnected to the flexible circuit board by the reflow soldering process and the camera module can be attached to the socket during a subsequent assembly process. An improved efficiency for the camera module assembly during mass production can thereby be expected.

Consequently, studies have been performed on new ways of connecting a flexible circuit board and a light-emitting diode disposed in juxtaposition with a camera module as the auxiliary light means for the above-mentioned autofocusing, for instance, by using a structure wherein the connection is accomplished by soldering to a camera module socket. By means of this method, a stable connection with the flexible circuit board is realized; therefore, there is no chance that the optical axis will shift from the intended direction during assembly inside a camera and high-precision autofocusing by the camera module can be expected.

A light-emitting diode with a high light intensity is preferred as the auxiliary light for autofocusing, but a shell-shaped light-emitting diode with a relatively high light intensity has not been used in portable telephones because it cannot be soldered to the flexible circuit board. A high-performance auxiliary lighting device that can be used for autofocusing from farther distances than in the past could be provided if a practical structure for connecting a shell-shaped light-emitting diode could be provided.

Furthermore, even if a surface-mounted light-emitting diode is used, the structure used for connection should be one that will facilitate manufacture and assembly. In addition, whether the light-emitting diode is shell-shaped or surface-mounted, light from the light-emitting diode for auxiliary light and other light-emitting elements inside the final product should not be detected intermittently by the camera module.

Therefore, the object of the present invention is to solve the above-mentioned problems and provide a practical structure for connecting the autofocus auxiliary light-emitting diode to the flexible circuit board.

SUMMARY OF THE INVENTION

The present invention provides a socket that is suitable for connecting a flexible circuit board and a light-emitting diode with a relatively narrow angle of emission for providing auxiliary light for autofocusing. The socket comprises a female spring terminal that will be connected to a terminal or an electrode, and a dome direction anchor for setting the direction of the dome section that makes up the lens of the light-emitting diode. The light-emitting diode can be detached from the socket. The socket is in juxtaposition with the socket structure that will hold the camera module and is jointed or formed as one unit with the housing. The dome section of the light-emitting diode is anchored such that it is inclined slightly toward the camera module inside the socket. The emitted light of the light-emitting diode is thereby radiated over the captured range of the camera module.

The anchor for setting the dome direction of the light-emitting diode engages with the curved surface of the dome section of the light-emitting diode, or a flange part or pedestal part disposed near the base end of the dome section, and sets the direction of the dome section. The anchor further acts such that an unintentional detachment of the light-emitting diode from the socket is prevented.

Furthermore, the socket of the present invention has the appropriate light-blocking means for preventing emitted light from the light-emitting diode from reaching the camera module. The light-blocking means is part of the housing or part of an electromagnetic shield for preventing interference with signals provided to the camera module. The electromagnetic shield can extend to the case housing of the final product or can be placed near the inside surface of the housing and when necessary, can be grounded.

The socket housing can also comprise additional circuit wiring between the camera module and the light-emitting diode, and this wiring can be held inside the housing together with an IC. For instance, switching components that are capable of controlling the light-emitting diode in accordance with the output of the camera module can be kept inside the housing. Furthermore, the socket housing can be such that it will hold additional light-receiving elements. For instance, autofocusing precision can be improved by a combined processing of detected signal data obtained from elements capable of detecting color with data detected from the camera elements or operating data from the light-emitting diode.

The present invention provides a structure for stable electrical connection to a light-emitting diode for auxiliary light that is simple and facilitates assembly. The direction of the optical axis of the dome section of the light-emitting diode is brought to face a predetermined relative position with respect to the optical axis of the camera module and is securely maintained in a state such that this optical axis will not shift. The socket, including the structure for holding the light-emitting diode for auxiliary light, can be connected to the flexible circuit board by reflow soldering during production; therefore, the camera module and light-emitting diode can thereafter be efficiently attached simultaneously.

BRIEF DESCRIPTION OF THE DRAWINGS

FIG. 4 is a drawing showing a schematic cross section of the socket that is the third embodiment of the present invention.

FIG. 5 is a drawing showing a schematic cross section of the socket that is the fourth embodiment of the present invention.

DETAILED DESCRIPTION OF THE PREFERRED EMBODIMENT

Preferred embodiments of the present invention will now be described in detail while referring to the attached drawings.

Figure 1:
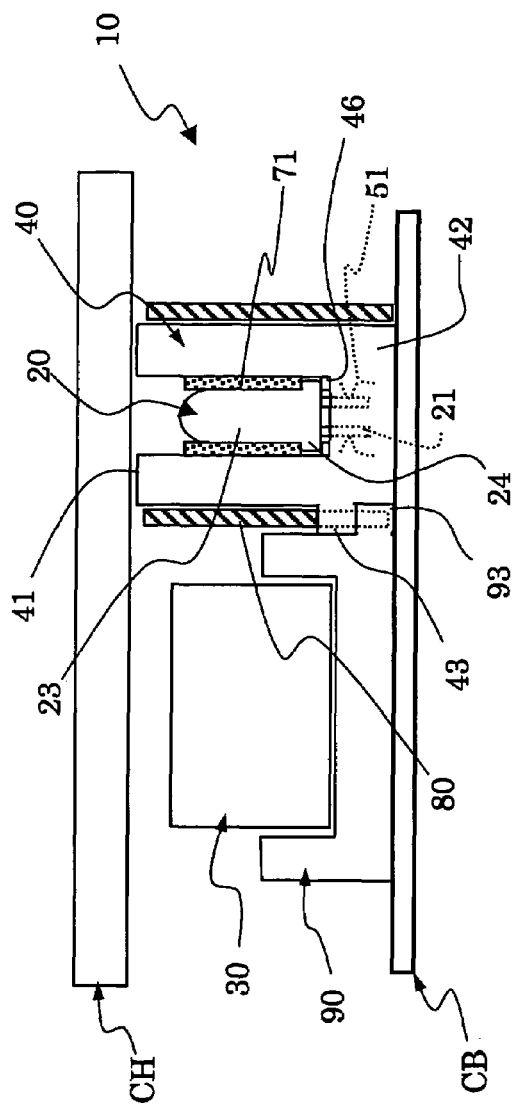
FIG. 1 is a drawing showing a schematic cross section of the socket that is the first embodiment of the present invention.

FIG. 1 is a drawing showing a schematic cross-section of a socket 10, which is the first preferred embodiment of the present invention. Socket 10 is mounted on a flexible circuit board CB and has two housings, a first housing 40 and a second housing 90. The two housings 40 and 90 are mechanically joined where they intersect as shown by reference numbers 43 and 93. A light-emitting diode 20 emits auxiliary light for autofocusing by a camera module 30, and the relative positional relationship between the two is kept constant by mechanically anchoring housings 40 and 90.

First housing 40 has a structure for holding a shell-shaped light-emitting diode 20. A base part 42 of the first housing has a spring contact 51 that touches the lead extending from light-emitting diode 20. Second housing 90 has a structure for holding camera module 30 and comprises a contact (not illustrated) that will touch an electrode at the base or the side of the camera module.

By means of the first embodiment, housing 40 has a wall part 41 that extends higher than housing 90 that holds camera module 30, and an electromagnetic shield 80 disposed such that current applied to light-emitting diode 20 will not affect the camera module or other peripheral elements. Wall part 41 and electromagnetic shield 80 extend up to near the outside case housing CH of the device that holds the flexible circuit board assembly, including socket 10; therefore, light emitted from light-emitting diode 20 is blocked by the concerted action of both the wall part 41 and the electromagnetic shield 80 or the singular action of one of these, and any irradiation to camera module 30 by this emitted light is prevented.

Furthermore, the part of electromagnetic shield 80 that extends between light-emitting diode 20 and camera module 30 is shown by a broken line near flexible circuit board CB in order to emphasize the linked structure of housings 40 and 90. For instance, it is possible to extend electromagnetic shield 80 up to near the flexible circuit board CB, and even between light-emitting diode 20 and camera module 30, by using the linked structure at the ends of the sides of housings 40 and 90 (the same is true in FIGS. 3 through 5 and FIG. 7 shown hereinbelow).

As explained in relation to the description of the prior art, light-emitting diode 20 held inside housing 40 is designed such that there is strong directivity so that auxiliary light can be transmitted up to relatively long distances. Consequently, it is necessary to anchor the direction of a dome section 23 of light-emitting diode 20, with the light-emitting diode contacting spring contact 51. By means of the present embodiment, an anchor 71 for setting the direction of dome section 23 is shown by reference number 71.

For instance, anchor 71 can be a member that prevents dome section 23 from coming loose and that lays over a flange part 24 of light-emitting diode 20 to serve as a safety lock for the light-emitting diode when the light-emitting diode is held from the top surface and then inserted from the top or the side into the structure for holding the light-emitting diode. This member is not necessarily rigid and can be a member with a certain amount of flexibility that supports dome section 23. A step part 46 made by molding as one unit with housing 40 is disposed at the bottom side of flange part 24 in this case, and flange part 24 is sandwiched in between step part 46 and anchor 71.

Another example is the case where light-emitting diode 20 is inserted from a slanted or horizontal direction and anchor 71 is a locking means that holds, aligns, and anchors dome section 23 of the inserted light-emitting diode. The locking means in this case can be molded as one unit with first housing 40. The light-blocking function can be maintained in this case by applying an electromagnetic shield or by adopting a structure wherein the chamber holding light-emitting diode 20 is closed using additional parts or parts molded as one unit with the housing.

Figure 2:
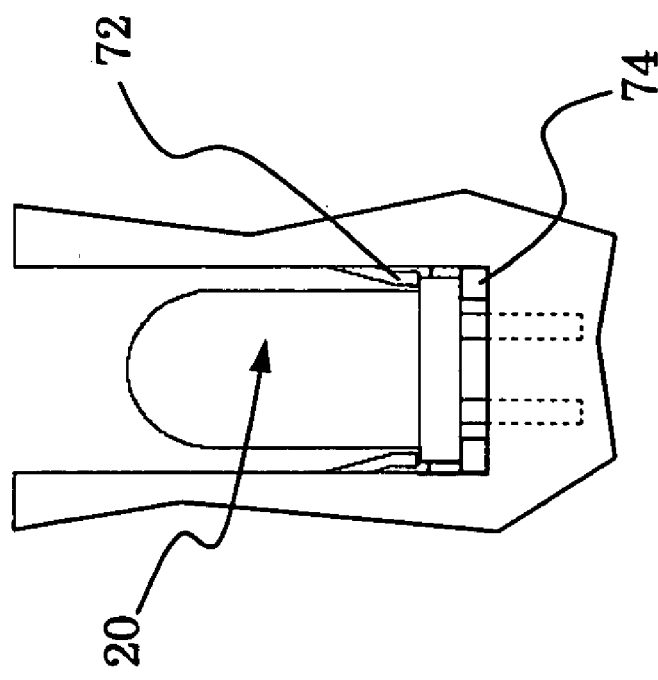
FIG. 2 is a schematic cross section of an example of other anchor used in the socket of the present invention.
Figure 2:
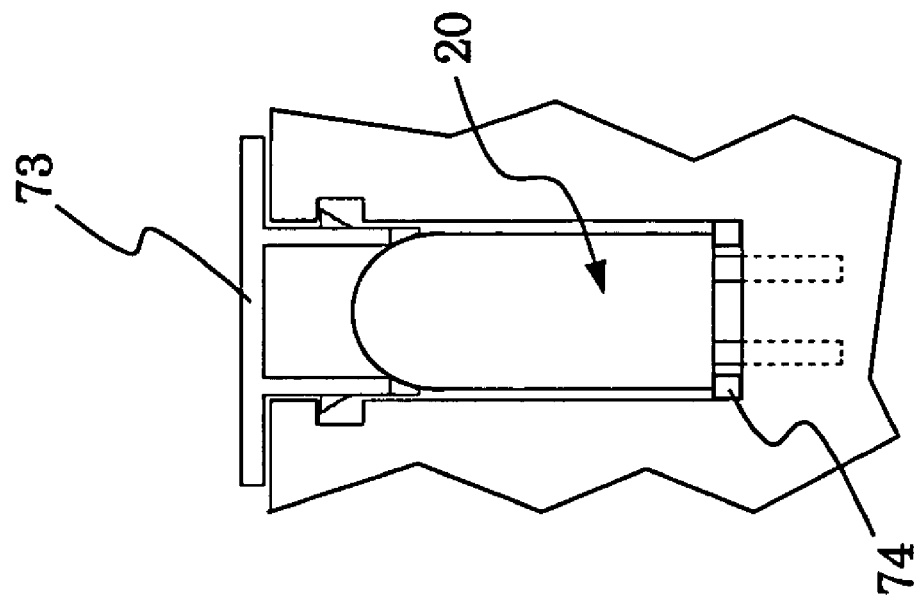

Yet another example of the anchor is shown in FIG. 2. Here, (a) shows the case of a locking arm 72 molded as one unit with housing 40, and (b) shows the case where an additional locking part 73 is used. A flexible member 74 or a similar element can also be situated at the base of dome section 23 to prevent the dome section from coming loose and a safety lock structure is provided by these locking means. When additional locking part 73 is used, a part of locking part 73 can engage with the structure for holding the camera module or part of the camera module such that the positional relationship with the camera module is precisely maintained.

Figure 3:
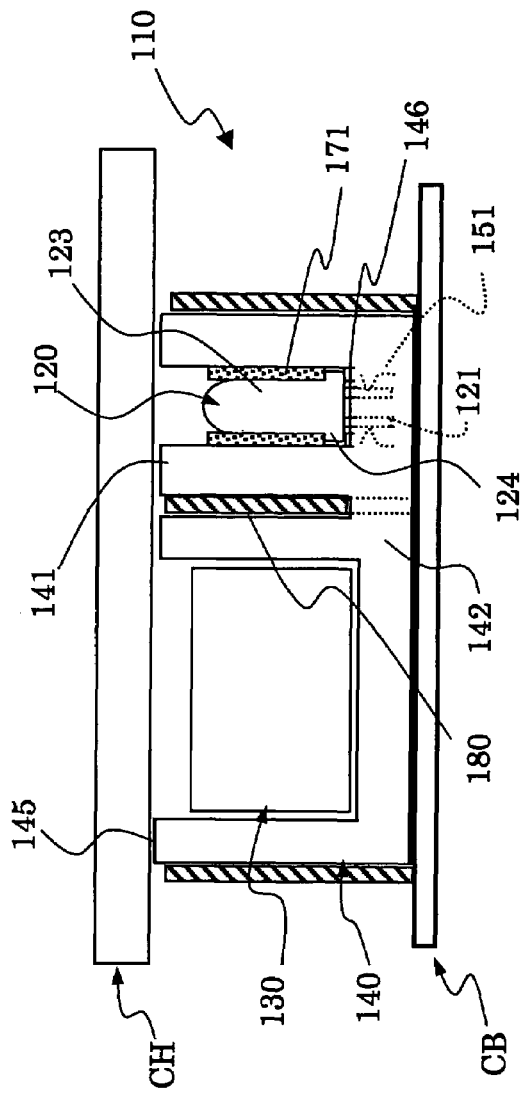
FIG. 3 is a drawing showing a schematic cross section of the socket that is the second embodiment of the present invention.

FIG. 3 shows a socket 110, which is a second embodiment of the present invention. The parts that have the same effect as the socket of the first embodiment are represented by adding 100 to the reference number used in the first embodiment and a description relating to the function thereof is omitted.

The difference from the first embodiment is that the second embodiment provides a housing 140 as a single molded article and an electromagnetic shield 180 as a part of the housing, and the structure of the housing for holding a camera module 130 has a wall 145 for blocking light. By means of the first embodiment, the position of a light-emitting diode 120 with respect to the camera module can be more precisely determined and stable properties can be guaranteed, and production and assembly are facilitated. The second embodiment has an advantage in that signals from light-emitting components other than light-emitting diode 120 inside a case housing CH will not reach the camera module.

FIG. 4 shows a socket 210 which is a third embodiment of the present invention. The parts that have the same effect as the socket of the first embodiment are represented by adding 200 to the reference number used in the first embodiment and a description relating to the function thereof is omitted.

The embodiment in FIG. 4 is similar to the second embodiment, but it differs from the second embodiment in that a light-emitting diode 220 is anchored inclined toward a camera module 230. As a result, there is an advantage in that when autofocusing is performed using camera module 230, reflected light of light-emitting diode 220 can be precisely radiated onto a position within and relatively near the center of the projection range wherein camera module 230 can receive light. The angle of inclination is preferably 1 or 2°, but it can be 1 to 5°.

FIG. 5 shows a socket 310 that is the fourth embodiment of the present invention. The parts that have the same effect as the socket of the first embodiment are represented by adding 300 to the reference number used in the first embodiment and a description relating to the function thereof is omitted.

This embodiment is similar to the second embodiment, but it is different in that a housing 340 does not have a relatively high light-blocking wall and only an electromagnetic shielding member 380 extends up near the inside surface of case housing CH. The present embodiment has advantages in that it provides the appropriate light-blocking means for a light-emitting diode 320 and a camera module 330 and it facilitates molding during the production of housing 340, as well as the attachment and assembly of light-emitting diode 320 and camera module 330.

Figure 6:
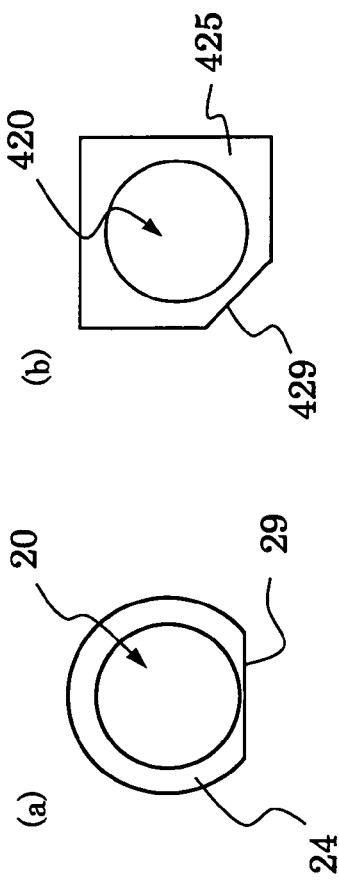
FIG. 6 is a drawing that describes other means for anchoring the height of the light-emitting diode.

By means of the above-mentioned first through fourth embodiments, light-emitting diodes 20, 120, 220, and 320 are aligned in the direction of height by bringing flange parts 24, 124, 224, and 324 into contact with step parts 46, 146, 246, and 346 formed in housings 40, 140, 240, and 340. However, as shown in FIG. 6, it is also possible to bring a flange part 28 formed in a lead 21 into contact with a shoulder part 49 formed in housings 40, 140, 240, and 340.

Figure 7:
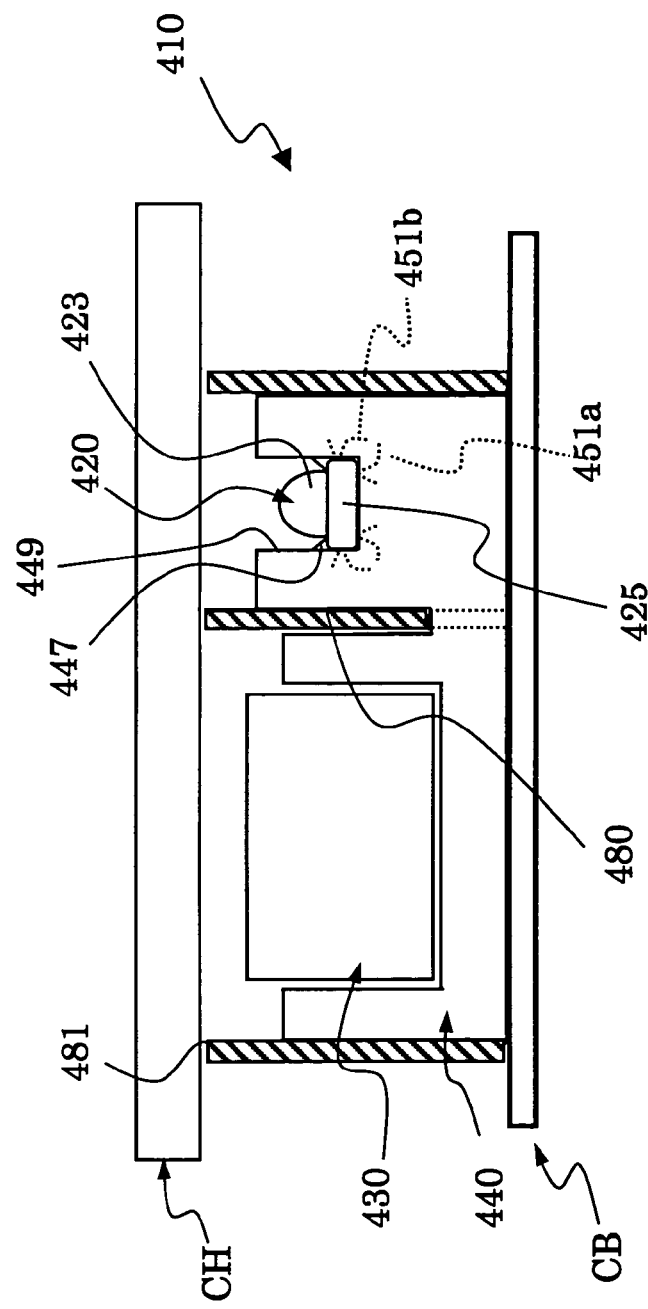
FIG. 7 is a drawing showing a schematic cross section of the socket that is the fifth embodiment of the present invention.

FIG. 7 is a drawing showing a socket 410, which is the fifth embodiment. The present embodiment is similar to the fourth embodiment, but it is different in that it has a structure wherein a light-emitting diode 420 that is used here has a surface-mounted electrode and a socket 410 holds this electrode. Light-emitting diode 420 comprises a pedestal 425 formed by wiring for supplying current to the LED chip inside and a dome section 423 that makes up the optical lens on top of the pedestal.

Socket 410 has a female spring contact, but the contact on the bottom shown by 451a can contact the electrode if the electrode (not illustrated) of light-emitting diode 420 is present only at the base, or the contact on the side shown by 451b can contact the electrode when the electrode is extended to the side. It should be noted that the contacts represented by 451a and 451b need not necessarily be selected and a type that contacts at two points can also be used.

By means of the present embodiment, light-emitting diode 420 is housed facing a predetermined direction inside a concave part 449 formed in housing 440 and is kept from coming loose by the spring property of contacts 451a and 451b, or by being held in place by a safety lock in the form of a locking means 447 formed as one unit or attached separately from housing 440. Consequently, dome section 423 of light-emitting diode 420 is anchored facing a pre-determined direction.

Figure 8:
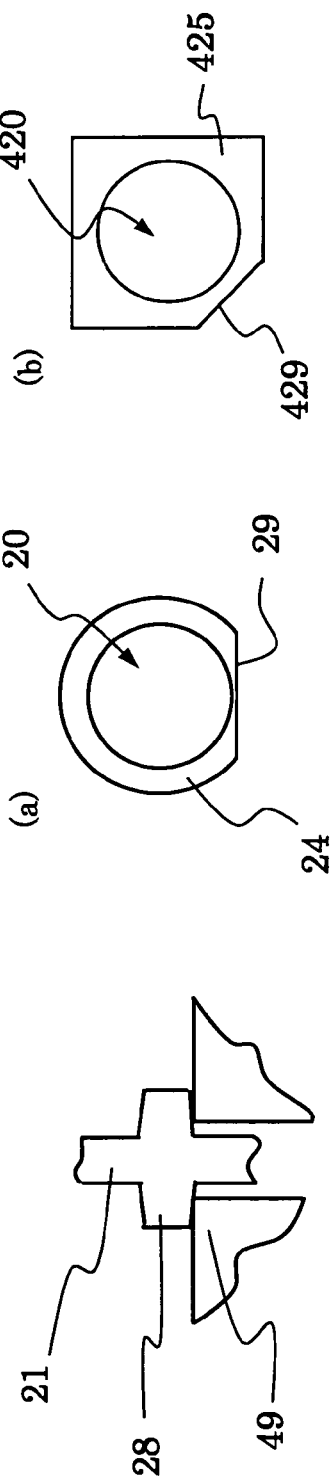
FIG. 8 is a plan view of a light-emitting diode that describes the key means for holding the light-emitting diode.

By means of the first through the fifth embodiments, the appropriate key means is used in order to hold the light-emitting diode facing a predetermined direction. FIG. 8 shows an example of a key means. Here, (a) is an example of a shell-shaped light-emitting diode, and (b) is an example of a surface mounted light-emitting diode. That is, a notch part 29 is made in a part of flange part 24 of shell-shaped light-emitting diode 20, or a notch part 429 is made in a part of pedestal 425 with surface-mounted light-emitting diode 420, and the shape of the housing structure for holding the respective light-emitting diodes is at least in part complementary to this notched part. As a result, the direction in which the light-emitting diodes are attached when light-emitting diodes 20 and 420 are being held by the flange or the pedestal is assured.

By means of the second through the fifth embodiments wherein the housing is formed as one unit, additional wiring can be disposed inside the housing in order to connect light-emitting diodes 120, 220, 320, and 420 to camera modules 130, 230, 330, and 430. For instance, when light-emitting diodes 120, 220, 320, and 420 are to be operated in accordance with signals detected by camera modules 130, 230, 330, and 430, additional wiring can be disposed inside so as to hold the circuit board on which an IC is mounted. The IC can operate such that the light-emitting diode is switched in accordance with output signals from the camera module.

Figure 9:
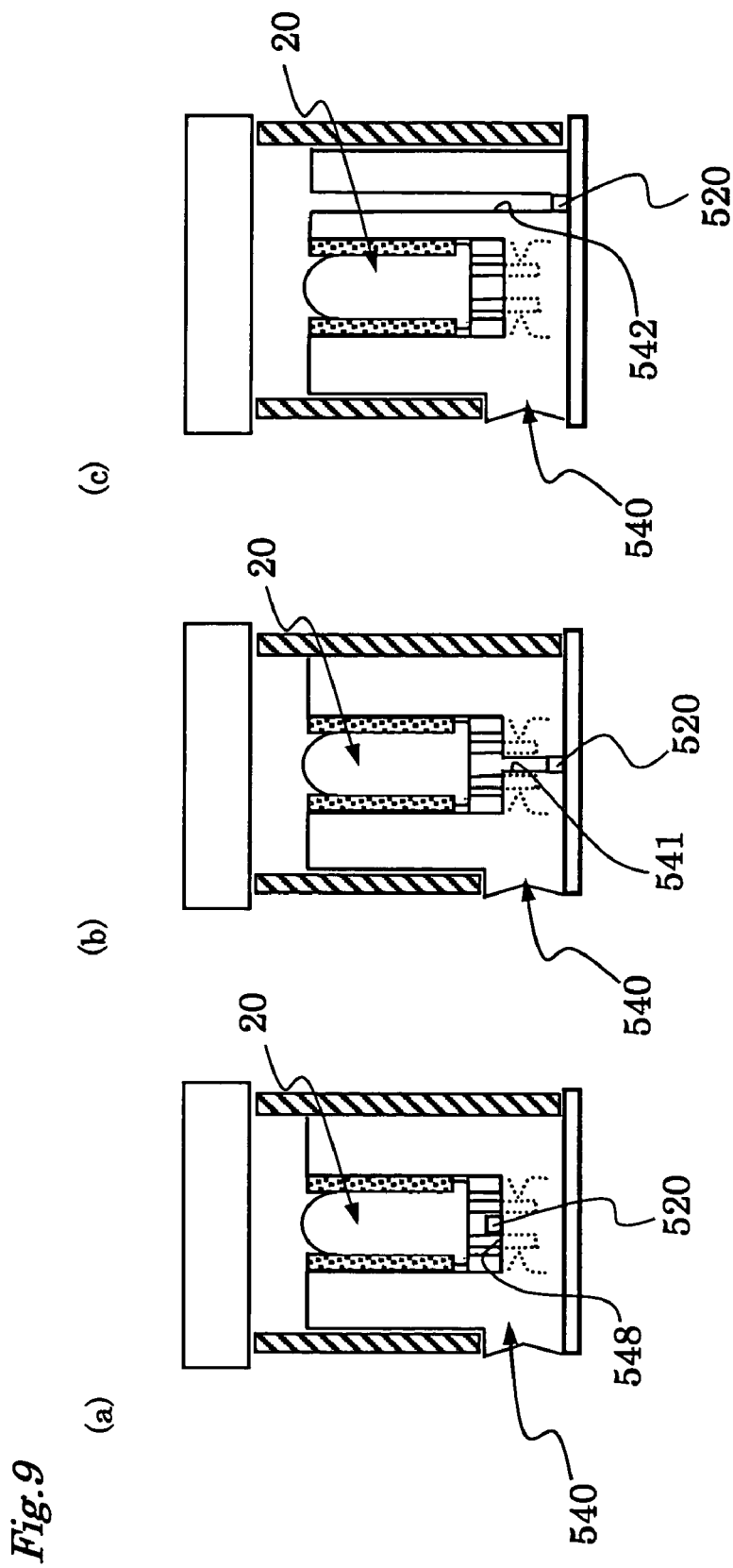
FIG. 9 is a drawing showing partial cross sections of a socket with an indicator.

Additional examples of the socket of the present invention are shown in FIG. 9. By means of this example, the shell-shaped light-emitting diode is used as an auxiliary light for autofocusing and an additional surface-mounted LED chip 520 is used as the indicator. LED chip 520 is at the back surface of the shell-shaped light-emitting diode, and the dome section of the shell-shaped light-emitting diode 20 therefore serves as the lens. The user can confirm the predetermined stance of the equipment by means of the light that is emitted from this LED chip 520 and passes through light-emitting diode 20. That is, the emission wavelength of LED chip 520 should be different from the emission wavelength of the auxiliary light so that the user can confirm that the indictor is working.

LED chip 520 can be mounted on a base 548 of the structure for holding the light-emitting diode inside housing 540, as shown in FIG. 9(a), or it can be premounted on a flexible circuit board, as shown in FIG. 9(b). In the latter case, a light path 541 is disposed inside housing 540, and the positions of light path 541 and the LED chip are aligned with one another during mounting. Light path 541 can also be formed as a space, or it can be filled with a resin or another material that is transparent to the emission wavelength.

Furthermore, the indicator LED chip can be placed in juxtaposition with the light-emitting diode for auxiliary light, as shown in FIG. 9(c). In this case, a light path 542 is disposed away from the structure for holding light-emitting diode 20. Although not illustrated, a lens with a predetermined shape can also be formed in the end on the outside (top end in the figure) of light path 542.

Furthermore, although not illustrated, additional light-receiving elements can be housed in the socket. For instance, RGB color sensors and other light-receiving elements capable of detecting color can be housed as one unit with the socket and anchored in virtually the same direction as the camera module or light-emitting diode. An RGB color sensor can improve autofocusing precision without requiring complex logic circuits by detecting the color data of the object that is the subject of autofocusing and using these data directly. That is, the color data can be combined with signals from the projection elements and used to process the autofocusing signals. In addition, a structure where light-receiving elements are housed in the socket has an advantage in terms of assembly during production.

Preferred embodiments of the socket of the present invention have been described, but these are merely examples and various changes and modifications by persons skilled in the art are possible.

What is claimed is:

1. A camera and auxiliary light assembly comprising:
   a circuit board;
   a camera module holding structure mounted on the circuit board and electrically connected thereto by reflow soldering and holding a camera module at a predetermined orientation, said camera module being operably mounted in said camera module holding structure without reflow soldering;
   a light source housing mounted on the circuit board adjacent the camera module holding structure and electrically connected thereto by reflow soldering and operably, detachably holding a light-emitting diode comprising a dome section, said light-emitting diode being operably, detachably held by said light source housing without reflow soldering; and
   an anchor for anchoring the light-emitting diode at an orientation with the central longitudinal axis of the dome section extending towards the camera module imaging field.

2. The assembly of claim 1 wherein the light source housing and the camera module holding structure each comprise a wall portion extending parallel to and mounted on an adjacent surface of the circuit board.

3. The assembly of claim 1, the light source housing comprising female spring terminals adapted to engage electrode portions of said light-emitting diode.

4. The assembly of claim 1, further comprising a light blocker positioned between said camera module and said light emitting diode, which prevents direct irradiation of the camera module with light from the light emitting diode.

5. The assembly of claim 4, further comprising an electromagnetic shield, wherein said electromagnetic shield is at least part of said light-blocker.

6. The assembly of claim 1 wherein said camera module holding structure is fixedly attached to said light source housing.

7. The assembly of claim 6 wherein said camera holding module and said light source housing are portions of a single molded unit.

* * * * *